UNITED STATES PATENT OFFICE.

NATHAN McKELFRESH, OF ELIZABETH, INDIANA.

IMPROVEMENT IN MEDICAL COMPOUNDS FOR CURE OF CANCER.

Specification forming part of Letters Patent No. 121,534, dated December 5, 1871.

*To all whom it may concern:*

Be it known that I, NATHAN MCKELFRESH, of the town of Elizabeth, in the county of Harrison and State of Indiana, have invented a certain new Compound or Composition for the Cure of Cancer, of which the following is a specification:

The nature of this invention consists: First, in taking the inner bark of the red-oak tree and burning it to ashes; after which, add to the ashes one-fourth part of unslaked lime; then pour water over it; after which, let it stand until the lye becomes as strong as possible; then place it in a vessel and boil it down until it becomes almost a thick mass. Then take alum-salt, one part, and potash, one-fourth part, and mix them together; then place them in a hole bored in a hickory log of sufficient size to receive them; after which plug up the hole with a piece of the same kind of wood; then build a fire over the log and burn it to ashes, when the salt and potash will remain in a hard solid mass; when cool, place it in a mortar and pulverize it completely; then pour a small quantity of water over it, only sufficient to dissolve it; then mix it with the lye made from the lime and ashes of the red-oak bark before mentioned and let it stand for several hours, when it will become a thick mass, which constitutes the composition ready for use.

Having thus fully described the ingredients in their several proportions of which my composition consists, what I claim as my invention is—

The manufacture or preparation and use of a compound for the cure of cancer of the ingredients, in their several proportions, as above described, and for the purpose hereinbefore set forth.

NATHAN x McKELFRESH.
his mark.

Witnesses:
RICHARD MASON,
E. F. HUYCK.

(98)